(12) United States Patent
Sprenger et al.

(10) Patent No.: US 10,126,842 B2
(45) Date of Patent: Nov. 13, 2018

(54) DEVICE FOR WRITING WITH CHARACTER STROKE SENSING

(71) Applicant: Intel Corporation, Santa Clara, CA (US)

(72) Inventors: Mark E. Sprenger, Tigard, OR (US); Christian Amoah-Kusi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/392,873

(22) Filed: Dec. 28, 2016

(65) Prior Publication Data

US 2018/0181219 A1      Jun. 28, 2018

(51) Int. Cl.
   *G06F 3/0354*     (2013.01)
   *G06K 9/22*       (2006.01)

(52) U.S. Cl.
   CPC ......... *G06F 3/03545* (2013.01); *G06K 9/222* (2013.01)

(58) Field of Classification Search
   CPC .................................................. G06F 3/03545
   USPC ............................ 178/18.01–19.07; 345/179
   See application file for complete search history.

(56) References Cited

U.S. PATENT DOCUMENTS 5,111,004 A * 5/1992 Gullman ................ B43K 7/005
                                                 178/19.04
6,703,570 B1 * 3/2004 Russell ..................... G01S 5/18
                                                 178/18.01
2015/0116285 A1   4/2015 Kling
2017/0068345 A1 * 3/2017 Barel .................. G06F 3/03545

FOREIGN PATENT DOCUMENTS

| KR | 10-2009-0001164 A | 1/2009 |
|---|---|---|
| KR | 10-2011-0074145 A | 6/2011 |
| KR | 10-2016-0070377 A | 6/2016 |
| WO | 2016-122605 A1 | 8/2016 |

OTHER PUBLICATIONS

Wang, D. (Dec. 2014) FDC1004: Basics of Capacitive Sensing and Applications. Texas Instruments. Retrieved from URL <<http://www.ti.com/lit/an/snoa927/snoa927.pdf>>[[retrieved on Jan. 19, 2017] 12 pages.

(Continued)

*Primary Examiner* — Michael Pervan
(74) *Attorney, Agent, or Firm* — Schwabe, Williamson & Wyatt, P.C.

(57) ABSTRACT

Embodiments of the present disclosure provide for an apparatus for a device for writing with character stroke sensing. In one instance, the device may include a body, a component for writing disposed substantially lengthwise inside the body, and one or more sensors disposed inside the body, substantially around with the component for writing, to sense deviations of the component for writing from a default position inside the body, in response to a contact of the component for writing with a writing medium. The sensed deviations are used to generate data indicative of character strokes the component for writing imparts on the writing medium. Other embodiments may be described and/or claimed.

18 Claims, 9 Drawing Sheets

(56) References Cited

OTHER PUBLICATIONS

Burrows, L. (Jul. 20, 2016) Artificial muscle for soft robotics: low voltage, high hopes. Retrieved from URL <<https://www.seas.harvard.edu/news/2016/07/artificial-muscle-for-soft-robotics-low-voltage-high-hopes>> [[retrieved on Jan. 19, 2017] 8 pages.

P&S Market Research (Feb. 29, 2016) Report on Global Digital Pen Market Expected to Grow at 17.6% CAGR During 2016-2022. Retrieved from URL <<http://www.prnewswire.com/news-releases/global-digital-pen-market-expected-to-grow-at-176-cagr-during-2016-2022-ps-market-research-570493471.html.. >> [[retrieved on Jan. 19, 2017] 9 pages.

Mueller, Pam A.; Oppenheimer, Daniel M., "The Pen Is Mightier Than the Keyboard: Advantages of Longhand Over Laptop Note Taking," Psychological Science, Jun. 2014, vol. 25, No. 6. doi: 10.1177/0956797614524581, [retrieved on Dec. 28, 2016] 3 pages.

Innovative Research and Products (iRAP), Inc. (Mar. 1, 2013) Report on Electro-Active Polymer Actuators and Sensors—Types, Applications, New Developments, Industry Structure and Global Markets, retrieved from URL <<http://www.innoresearch.net/report_summary.aspx?id=83&pg=129&rcd=ET-116&pd=3/1/2013>> [retrieved on Dec. 28, 2016] 4 pages.

EAP-Bulletin (2015), 2015 Parker Hannifin Corporation. Electroactive Polymer (EAP) Technology Energy-efficient, lightweight, quiet, and flexible, 2 pages.

[Benjamin O'Brien, www.stretchsense.com]. (Jul. 4, 2013). StretchSense Hand Animation [Video File] retrieved from URL <<https://www.youtube.com/watch?v=wTyhijC7cBk>> [retrieved on Dec. 28, 2016] 1 page.

[Benjamin O'Brien]. (Oct. 13, 2013). StretchSense Stretch Sensors—Ben's Interview [Video File] retrieved from URL <<https://www.youtube.com/watch?v=7uh0UWPEur4>> [retrieved on Dec. 28, 2016] 4 pages.

International Search Report and Written Opinion dated Mar. 8, 2018, issued in International Application No. PCT/US2017/061193, 10 pages.

\* cited by examiner

DEVICE FOR WRITING WITH CHARACTER STROKE SENSING

FIELD

Embodiments of the present disclosure generally relate to the field of intelligent devices, and more particularly, to a device for writing with ability to sense character strokes to identify handwriting.

BACKGROUND

Currently, "smart" writing devices, such as "smart" pens that are available on the market require additional external components to complement the smart pens, in order to detect and identify pen strokes when using such devices on a writing medium. For example, additional sensors need to be attached to the medium to be written on, in order to receive and process handwriting by the "smart" pen. In some instances, special media may need to be used with the "smart" writing devices. For example, the medium may have special features, such as a special dot matrix paper. In another example, electronic media may need to be used under the paper, in order to receive and process the writing. These additional implements may complicate the use of the so called "smart" writing devices. The writing device, itself, is actually not "smart."

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Embodiments of the present disclosure include techniques and configurations for a device for writing with character stroke sensing. In accordance with embodiments, the device may include a body, a component for writing disposed substantially lengthwise inside the body, and one or more sensors disposed inside the body, substantially around the component for writing, to sense deviations of the component for writing from a default position inside the body, in response to a contact of the component for writing with a writing medium. In embodiments, the sensors may be disposed to provide a contact with the writing component. The sensed deviations are used to generate data indicative of character strokes the component for writing imparts on the writing medium.

In the following detailed description, reference is made to the accompanying drawings that form a part hereof, wherein like numerals designate like parts throughout, and in which are shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical, electrical, or optical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

Figure 1:
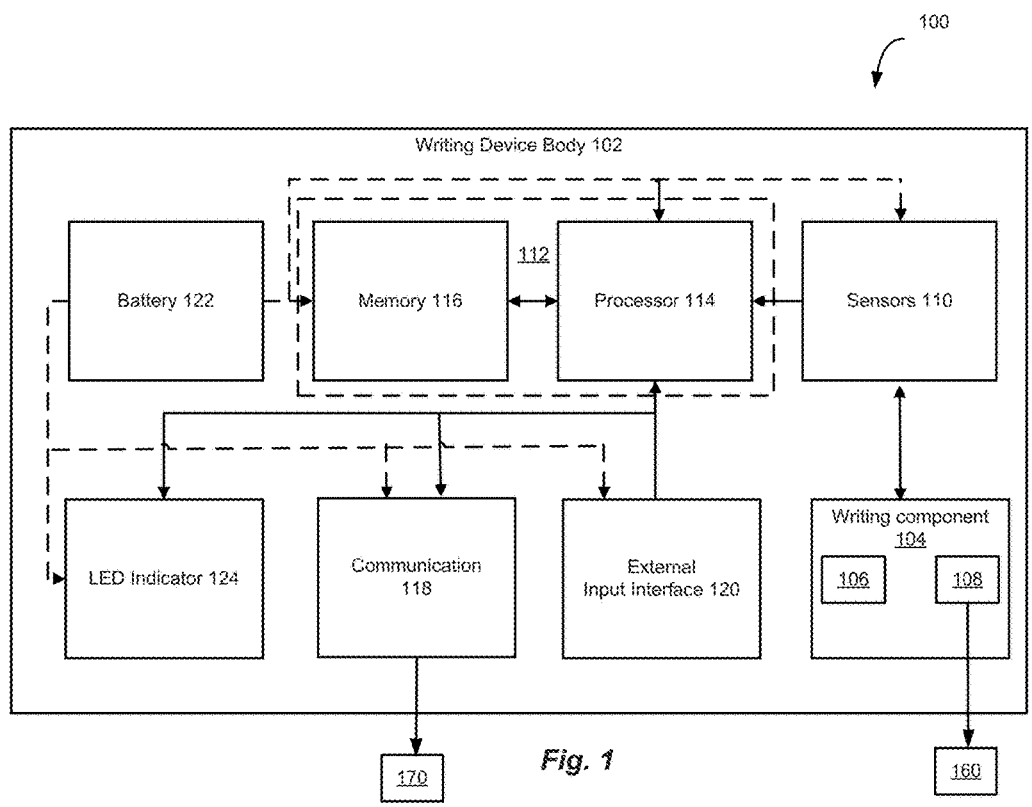
FIG. 1 is an example block diagram of a device for writing (writing device) with character stroke sensing, in accordance with some embodiments.

FIG. 1 is an example block diagram of a device for writing (hereinafter, writing device) with character stroke sensing, in accordance with some embodiments. In embodiments, the writing device 100 may include a body 102, which may form a physical frame of different shapes (some of which are described herein), to house various components of the writing device described herein. For example, the body 102 of the writing device may have an elongated shape, convenient for holding by a user.

The body 102 may have a space configured to house a component for writing 104 (hereinafter "writing component"), which may be insertable into or otherwise coupled with the body 102. In embodiments, the writing component 104 may comprise a cartridge 106 having (or coupled with) a writing tip 108 to contact with a writing medium 160 (e.g., screen, paper, or any other medium). In embodiments, the writing component 104 may be disposed substantially lengthwise inside the body 102 of the writing device 100.

The writing component 104 may be configured to transfer ink, graphite, or other substance to the writing medium 160 in response to contact with the medium (e.g., when the user is writing using the writing device 100). In some embodiments, the writing component 104 may comprise a stylus and may be configured to interact with a screen of a computing device (not shown). Accordingly, the strokes generated by the user may be inputted to the screen as an electric-based input. The writing component 104, in response to interaction of the writing tip 108 with the writing medium 160, may be subject to application of an axial force a radial force (hereinafter, resistance force), or combination of the axial and resistance force that may result from a contact of the writing tip with the writing medium 160. The radial force may be a vector sum of the resistance force from friction and the radial component force due to the angle of the writing tip of a writing component being pressed against the writing medium. The axial force may be a vector sum of the force of the writing component on the writing medium, translated in the writing component axis. The radial (resistance) force may be orthogonal to the axial force. As will be described below in more detail, the writing component 104 may translate the forces applied to writing tip 108 into a motion, such as a deviation from the writing component 104 default position inside the body 102. The default position of the writing component 104 may be a position of the writing component 104 inside the body 102 in the absence of contact with the writing medium (e.g., a position assumed by the writing component 104 in response to its insertion into the body 102).

The writing device 100 may include one or more sensors 110 disposed inside the body 102 to sense a deviation of the writing component 104 from a default position inside the body 102. In embodiments, the sensors 110 may comprise capacitive sensors, such as electroactive polymer (EAP) capacitive sensors, which may generate an electric charge (or change capacitance) in response to a strain, such as stretch or compression. In general, any sensor that exhibits an electric response (e.g., change in charge, voltage, etc.) in response to mechanical forces, such as stretching, contracting, or bending, may be used with the writing device 100.

In embodiments, the sensors 110 may be disposed substantially around with the writing component 104, and may compress and/or stretch in response to a change of position of the writing component 104 inside the body 102. In embodiments, the sensors 110 may be in contact with the writing component 104 (The disposition of the sensors 110 inside the body 102 will be discussed below in greater detail.) Accordingly, the sensors 110 may generate readings (e.g., capacitance changes) that may indicate a measure of the deviation of the writing component 104 from the default position inside the body 102 of the writing device 100. The deviation of the writing component 104 from the default position inside the body 102 in response to a contact of the writing component 104 with the writing medium 160 may be indicative of character strokes generated from this contact. Based on the character strokes, the text characters may be inferred, as described below in greater detail.

In some embodiments, the writing device 100 may further include a processing block 112 coupled with the sensors 110 and disposed inside the body 102. The processing block 112 may be configured to receive and process sensor readings from the sensors 110, and generate data indicative of character strokes generated from the contact of the writing component 104 with the writing medium 160, based on the sensor readings. In other embodiments, the processing block 112 may be disposed outside the writing device 100, e.g., at an external computing device 170, and the readings of the sensors 110 may be provided to the external device 170 for processing. In embodiments, the processing block 112 may be integrated in a System-on-a-Chip (SoC) configuration and reside on a printed circuit board (PCB) or on a flexible printed circuit (FPC).

The processing block 112 may include a processor 114, and a memory 116. The processor 114 may include, for example, one or more processors situated in separate components, or alternatively one or more processing cores embodied in a component (e.g., in an SoC configuration), and any processor-related support circuitry (e.g., bridging interfaces, etc.). Example processors may include, but are not limited to, various microprocessors including those in the Pentium®, Xeon®, Itanium®, Celeron®, Atom®, Quark®, Core® product families, or the like. Examples of support circuitry may include host side or input/output (I/O) side chipsets (also known as northbridge and southbridge chipsets/components) to provide an interface through which the processor 114 may interact with other system components that may be operating at different speeds, on different buses, etc. in the writing device 100. Some or all of the functionality commonly associated with the support circuitry may also be included in the same physical package as the processor.

In embodiments, the processor 114 may be configured to receive sensor data (also referred to as readings) indicative of the voltages sensed by the capacitive sensor and the time (duration) of the voltage, and to store the received sensor data in the memory 116. The data may further comprise time periods to provide the character strokes, time periods between the character strokes, and/or duration of a sensing session. The processor 114 may be further configured to retrieve the sensor data stored in the memory 116 and cause the processing block 112 to transfer the sensor data through a wireless communication protocol (e.g., implemented as a communication block 118) to an external device (not shown). The processor 114 may be further configured to respond to user input (e.g., store user input in memory 116 or take various actions according to the commands provided via user input described below). The processing block 112 may include components configured to record and process the readings of the sensors 110, and further perform operations described above. The processing block 112 may provide these components through, for example, a plurality of processor-readable instructions stored in the memory 116 and executable on the processor 114.

The memory 116 of the processing block 112 may be configured to store the data indicative of character strokes generated by the processor 114, and may be accessible by the processor 114 for data transmission. The memory 116 may comprise random access memory (RAM), read-only memory (ROM) in a fixed or removable format or other persistent solid state storage. RAM may include volatile memory configured to hold information during the operation of apparatus 100 such as, for example, static RAM (SRAM) or dynamic RAM (DRAM). ROM may include non-volatile (NV) memory circuitry configured based on basic input/output system (BIOS), Unified Extensible Firmware Interface (UEFI), etc. to provide instructions when processor 114 is activated. Examples of persistent solid state storage may include programmable memories such as electronic programmable ROMs (erasable programmable read-only memory), Flash, phased change memory, and so forth.

The writing device 100 may further include a communication block 118 coupled with the processing block 112 and configured to transmit the readings provided by the sensors 110 or the result of processing the readings by processor 114 to an external device 170, e.g., a smart watch, a smartphone or other computing device accessible by the user. The results may be transmitted via a wireless network, such as any type of near-field communication network (NFC), Wi-Fi, Bluetooth®, Infrared Data Association (IrDA) protocol or the like. The memory 116 and processor 114 may be coupled with the communication block 118, e.g., via universal asynchronous receiver transmitter (UART).

In some embodiments, some or all of the functions of the processing block 112 described above may be performed by the external device 170. For example, the processing may be done by an external device or system such as a phone, a tablet, edge system or cloud computing system. Accordingly, the communication block 118 may be configured to transfer or stream the sensor data to the external device 170. For example, the communication block 118 may include circuitry configured to facilitate a provision of readings from sensors 110 embedded in or otherwise coupled with the writing device 100, to the external device 170. Such circuitry (not shown) may include, for example, an amplifier, an analog-to-digital converter (ADC) and a controller to operate the circuitry. In some embodiments, the circuitry may be integrated in a form of an integrated circuit (IC). Further processing of the sensor data may include generation of letters and words based on the character strokes that may be inferred from the sensor data.

The writing device 100 may further include an external input interface 120. The external input interface 120 may be implemented as one or more buttons, switches or other types of interface responsive to user input. The external user interface 120 may be used to change modes or states of the writing device 120, and indicate commands provided by a user to change such modes or states. For example, the commands may indicate powering on and off the device 100, entering or exiting a low power state, initiating data transfer, and the like.

The writing device 100 may further include a battery 122 to power the writing device 100, including the processing block 112. The battery 122 may be disposed inside the body 102 of the writing device 100.

The writing device 100 may further include one or more light indicators 124 disposed on the body 102, such as a light emitting diode (LED). The light indicator(s) 124 may be configured to show a level of charge of the battery 122. The light indicator(s) 124 may be configured to indicate to the user the status of the pen i.e. power on/off, standby, transmitting, low battery charge, low memory volume, and the like The processor 114 may be configured to control the status indications of the light indicator 124.

Figure 2:
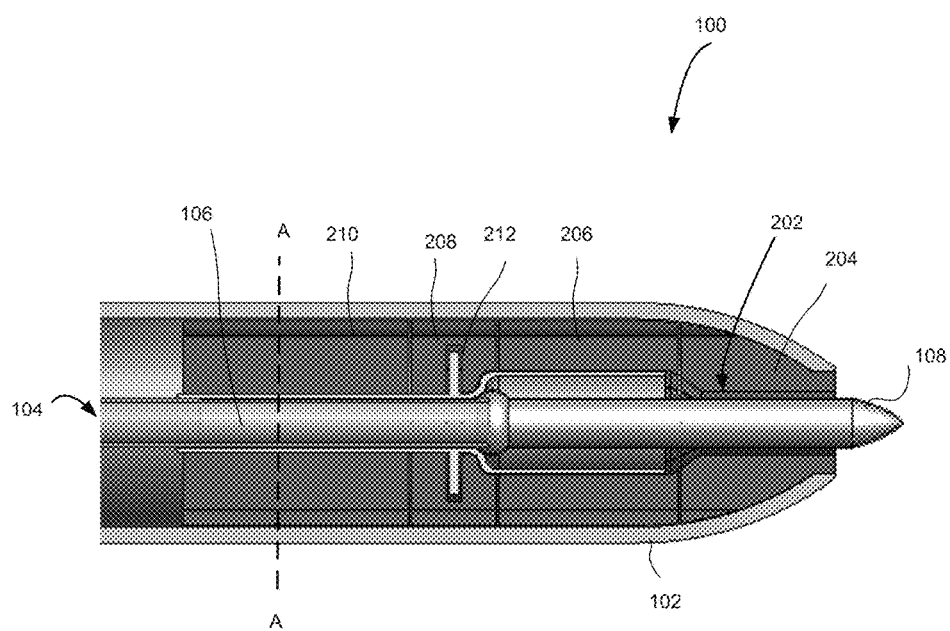
FIG. 2 illustrates an example writing device, in accordance with some embodiments.

FIG. 2 illustrates an example writing device, in accordance with some embodiments. For ease of understanding, like components of FIGS. 1 and 2 (and subsequent figures) are indicated by like numerals. In embodiments, the writing device 100 may take different shapes, forms, and sizes, in addition or as an alternative to the writing device 100 illustrated in FIG. 2 and subsequent figures. Accordingly, the shape, size, and form of the example writing device 100 are illustrated in FIG. 2 and subsequent figures for purposes of understanding and are not limited to this disclosure.

More specifically, FIG. 2 illustrates a longitudinal cross-section of a portion of the example writing device 100. As shown, the writing component 104 may include a cartridge 106 and tip 108 extending from the body 102. The writing component 104 may have an elongated shape and may be installed inside the body in longitudinal direction. The sensors 110 may include a plurality of sensors disposed substantially around an area (shaft) 202 of the body 102, into which the writing component 104 may be installed (e.g., inserted). As shown, the sensors 110 may include a plurality of sensors 204, 206, 208, 210 disposed around the writing component 104, and/or to provide a contact with the writing component 104, which may allow to sense movements of the writing component 104 inside the body 102. While four sensors are shown in the illustrative embodiment of FIG. 4, it will be understood that any number of sensors may be installed inside the writing device 100, in order to detect the movement of the writing component 104 with a desired accuracy.

In embodiments, the body 102 may include a plate 212 disposed substantially around the shaft 202, to be in contact with the writing component 104 and with at least some of the sensors (e.g., 208, as shown). The plate 212 may serve to transfer the movement of the writing component 104 inside the body 102 to the sensor 208, in order to provide a desired level of stress (stretch and/or compression) to the sensor 208, resulting from the movement of the writing component 104.

Figure 3:
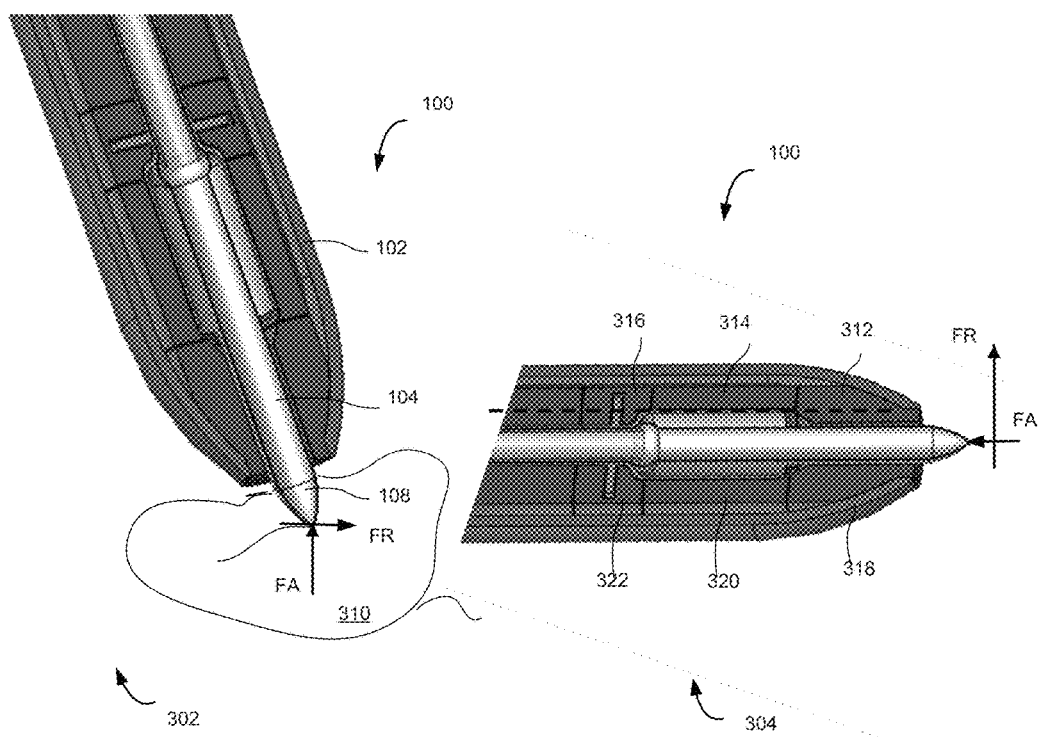
FIG. 3 illustrates various cross-sectional views of the writing device of FIG. 2, in accordance with some embodiments.

FIG. 3 illustrates various cross-sectional views of the writing device of FIG. 2, in accordance with some embodiments. As shown in views 302 and 304, in response to application of the writing tip 108 to a writing medium 310 (e.g., paper or other medium) a resistance force FR and/or axial force FA may be applied to the writing tip 108 (and accordingly, to the writing component 104 inside the body 102). The force FA may result from pressing the writing device 100 into the medium 310, and the force FR may result from sliding or rolling the tip 108 across the medium 310 during interaction with the medium 310, for example, writing or drawing. As shown in view 304, the sensors 312, 314, and 316 may deform predominantly in response to FR, and sensors 318, 320, 322 may deform predominantly in response to FA.

Figure 4:
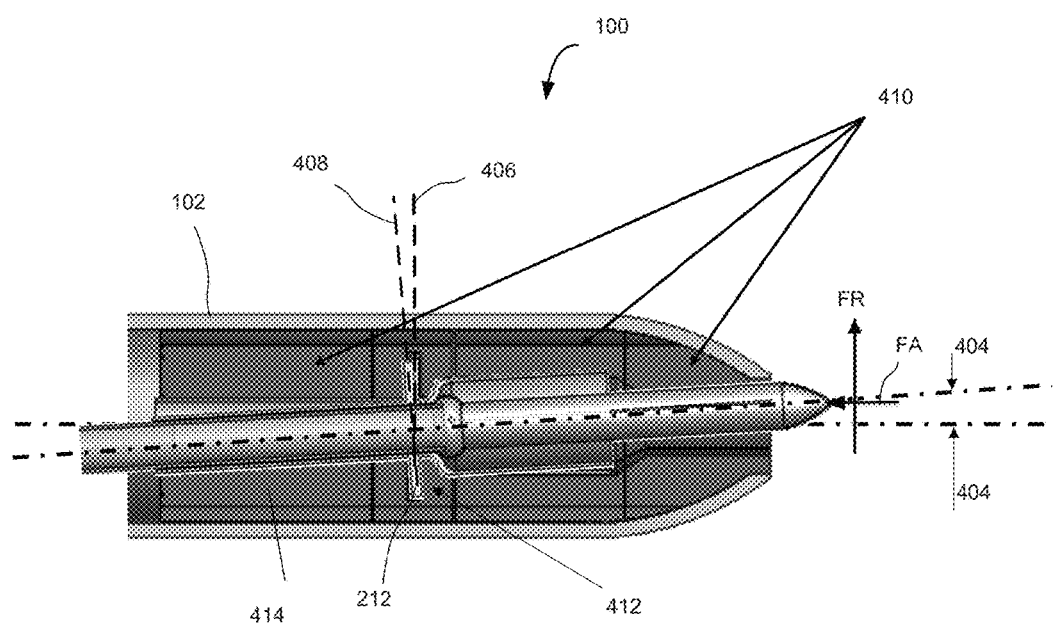
FIG. 4 illustrates a cross-sectional view of the writing device of FIGS. 2-3, showing a deviation of the writing component that results from a contact of the writing device with a writing medium, in accordance with some embodiments.

FIG. 4 illustrates a cross-sectional view of the writing device of FIGS. 2-3, showing a deviation of the writing component that results from a contact of the writing device with a writing medium, in accordance with some embodiments.

In response to application of forces FR and/or FA (in some instances, a combination of FR and FA), resulting from a contact of the writing component 104 with a writing medium (not shown), the writing component 104 may deviate (deflect) from its original position inside the body 102 indicated by axis 402, to a position indicated by axis 404. Such deviation may cause a corresponding deviation of the plate 212 from its original position indicated by axis 406 to a position indicated by axis 408. In response to the deviations of the writing component 104 and the plate 212, some sensors inside the body 102 may stretch, and others may compress. For example, sensors 410 may stretch (due to extra space in the location of sensors 410 caused by the deviation of the writing component 104), and sensors 412, 414 may correspondingly compress (due to less space in the location of sensors 412, 414 caused by the deviation of the writing component 104).

Combination of such dynamic stretches and compressions may cause corresponding voltages to be produced by the sensors, which may be indicative of strokes imparted by the writing component on the writing medium. This data may be recorded and stored, and retrieved for further processing. The processing may involve determining strokes imparted by the writing device 100 on the writing medium, and subsequent inference of letters and characters, based on the determined strokes.

Figure 5:
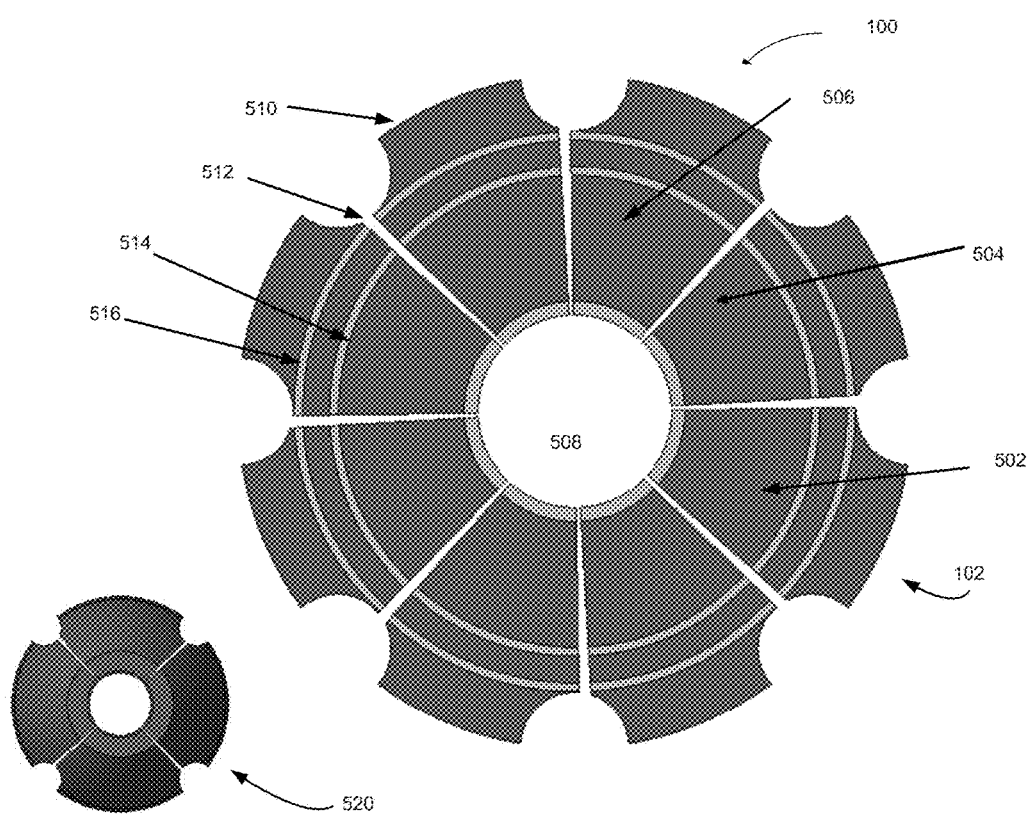
FIG. 5 is a transverse cross-sectional view of the writing device of FIGS. 2-4, in accordance with some embodiments.

FIG. 5 is a transverse cross-sectional view of the writing device of FIGS. 2-4, in accordance with some embodiments. More specifically, FIG. 5 illustrates a cross-sectional view of the writing device 100 along the line A-A shown in FIG. 2. More specifically, FIG. 5 shows a disposition of sensors inside the writing device 100. As shown, a plurality of sensors 502, 504, 506 may be disposed substantially radially inside the body 102 of the device 100, around an area 508 into which a writing component (not shown) may be installed (e.g., inserted). Accordingly, for these embodiments, the sensors 520, 504, 506 may also be in contact with the writing component (when installed), to sense deviations of the writing component from its default position inside the body 102.

As shown, the body 102 may comprise outer casing 510 with wire routing channels 512, to provide wiring to the sensors 502, 504, 506. Numerals 514 and 516 indicate the sensors' electrodes (lower and upper electrodes respectively). As discussed above, the sensors 502, 504, 506 may comprise polymer-based capacitive sensors. While eight sensors are shown in the illustrative example of FIG. 5, it is understood that any number of sensors may be disposed around the area 508, for example two, four (as shown in view 520), six, and so on, depending on required precision of sensing of the deviations of the writing component.

Figure 6:
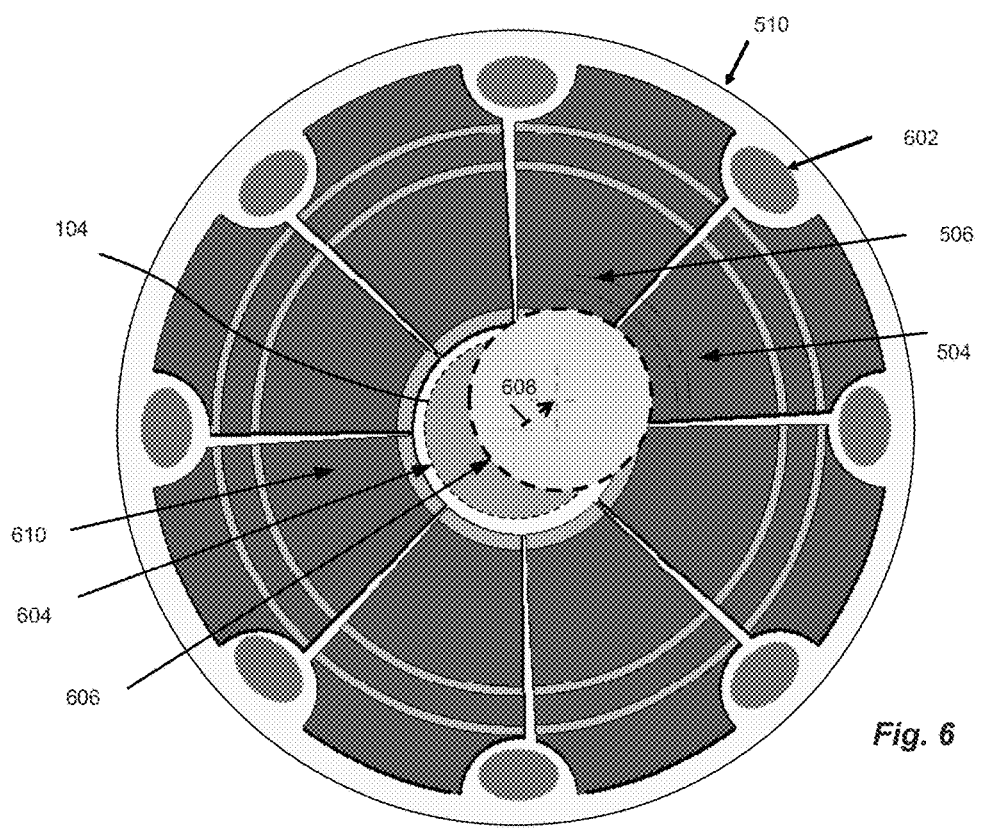
FIG. 6 is another transverse cross-sectional view of a portion of the writing device of FIGS. 2-4, with installed writing component, in accordance with some embodiments.

FIG. 6 is another transverse cross-sectional view of a portion of the writing device of FIGS. 2-4, with installed writing component, in accordance with some embodiments. For ease of understanding, like components of FIGS. 5 and 6 are indicated by like numerals. As shown, the outer casing 510 of the body 102 may include vias for sensor wires 602.

The writing component 104, in response to a contact with a writing medium (not shown), may deviate from its default position 604 to a position 606, causing a compression force 608 to apply to sensors 504, 506, causing the sensors 504, 506 to compress and provide corresponding voltage via wires 602 to the processing block (not shown). The sensors located substantially opposite the compressed sensors 504, 506 (e.g., sensor 610) may stretch correspondingly. The detection of the forces applied to the writing component 104, the times the forces are applied, and direction of the applied forces may be used to infer a stroke of the writing device 100. Each stroke may be compiled and compared to known character strokes and the letters and then words may be inferred from these stroke data, as described below in greater detail.

Figure 7:
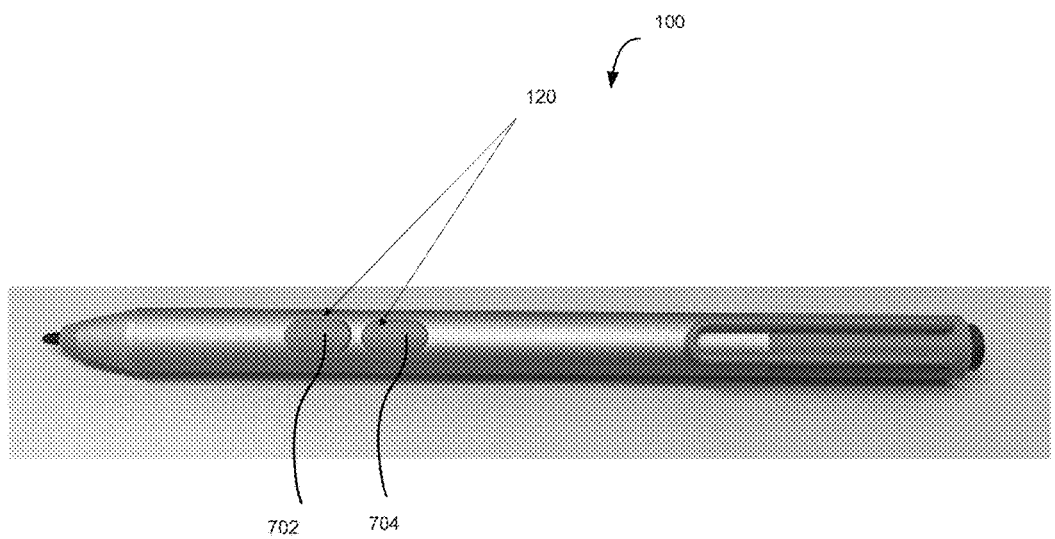
FIG. 7 is a side view of an example writing device provided in accordance with some embodiments.

FIG. 7 is a side view of an example writing device provided in accordance with some embodiments. As shown, the writing device 100 may include the external input interface 120 in a form of one or more buttons 702, 704. As discussed above, the buttons 702, 704 (or other user input components) may serve to accept user commands and provide them to the processing block for execution. For example, the user of the writing device may be able to separate notes by pages, by clicking a required button between pages.

The described embodiments of a writing device provide some advantages compared to conventional solutions. As described above, the sensor data associated with the user activity with the writing device may be used to identify character strokes, the times of stroke and the times between strokes. Based on the identified strokes (or series of strokes), the language of writing, handwriting type, and other components, text characters (e.g., letters and words) may be reconstructed. Therefore, the orientation of the writing device relative to the writing medium may not be required, because the characters inference may be based on dictionary tools. The user's handwriting style may be learned over time based on their corrections to improve accuracy of character recognition.

The writing device according to the embodiments described herein may be used with any type of writing media. The user may write in cursive or capital letters and may use a delay between words, which may be used to separate the words. The stroke and time data may be collected within the body of the writing device or transferred to an external device. The writing device may predict the letters by matching strokes and inferring a path from these strokes. The data may be evaluated and matched to known letters and words.

Figure 8:
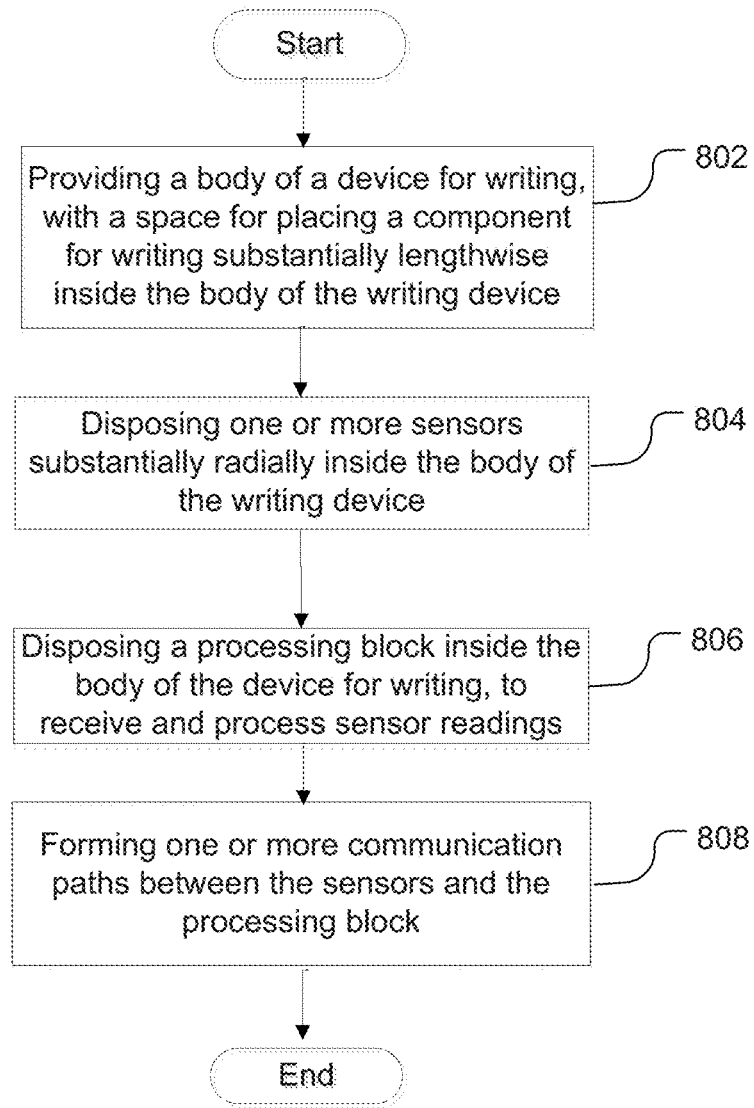
FIG. 8 is a process flow diagram for providing a device for writing with character stroke sensing, in accordance with some embodiments.

FIG. 8 is a process flow diagram for providing a device for writing with character stroke sensing, in accordance with some embodiments.

The process 800 may begin at block 802 and include providing a body of the device for writing, with a space for placing a component for writing substantially lengthwise inside the body of the writing device. In embodiments, the device for writing may comprise a pen or other device for writing, and have an elongated shape. The component for writing may comprise an ink cartridge or other container with a writing tip, to impart character strokes on a writing medium.

At block 804, the process 800 may include disposing one or more sensors substantially radially inside the body of the writing device. The sensors may be disposed to surround the component for writing in response to placing the component for writing inside the body of the device for writing. Accordingly, the sensors may be disposed substantially around the space for placing the component for writing inside the body of the device for writing, e.g., in a circular configuration. The sensors may sense deviations of the component for writing from a default position inside the body, in response to a contact of the component for writing with the writing medium. The sensed deviations may be indicative of character strokes that the component for writing may impart on the writing medium.

At block 806, the process 800 may include disposing a processing block inside the body of the device for writing, to receive and process sensor readings. The sensor readings may indicate a measure of the deviation of the component for writing from the default position inside the body of the device for writing.

At block 808, the process 800 may include forming one or more communication paths between the sensors and the processing block, to provide for receiving the sensor readings by the processing block.

Figure 9:
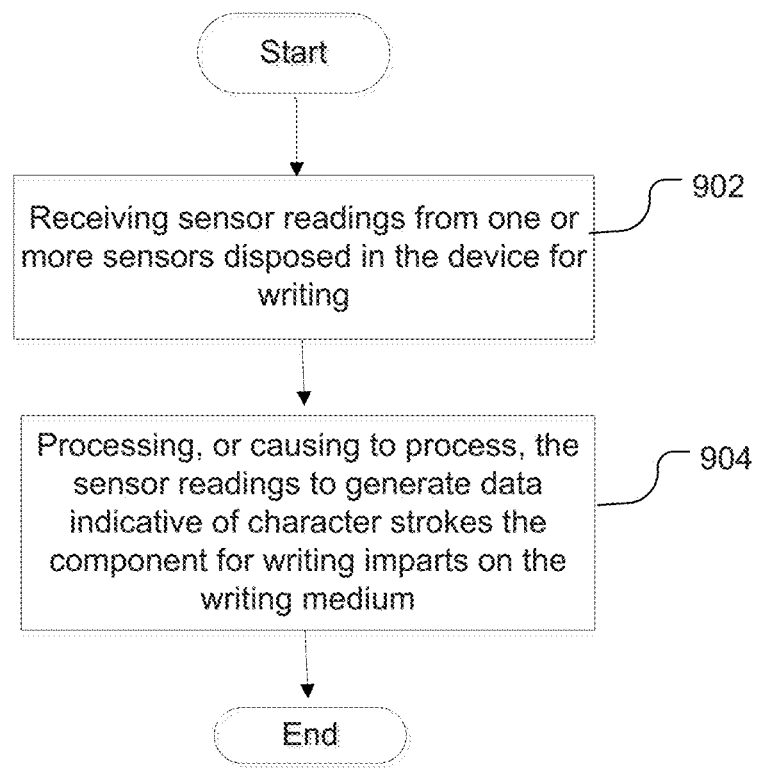
FIG. 9 is a process flow diagram for processing sensor data provided by a device for writing with character stroke sensing, in accordance with some embodiments.

FIG. 9 is a process flow diagram for processing sensor data provided by a device for writing with character stroke sensing, in accordance with some embodiments. The process 900 may comport with and be performed by some of the elements of the various embodiments earlier described in reference to FIGS. 1-8. In alternate embodiments, the process 900 may be practiced with more or fewer operations, or a different order of the operations. The process 900 may be performed, for example, by the processing block 112 of the writing device 100 of FIG. 1. As described above, the actions of the process 900 may be performed in a distributed manner. For example, the sensor data may be gathered at the writing device and transmitted to an external device for further processing. In another example, some of the processing (e.g., sensor data pre-processing) may be done at the writing device, while other parts of the processing (e.g., inference of text characters, such as letters, words, and/or sentences) may be done at the external device.

The process 900 may begin at block 902 and include receiving sensor readings from one or more sensors disposed in the device for writing and communicatively coupled with the computing device. The readings may indicate deviations of a component for writing of the device for writing from a default position inside the device for writing, in response to a contact of the component for writing with a writing medium. The sensor readings (data) may include voltages provided by sensors in response to stress or compression caused by the deviation of the writing component from its default position inside the writing device, as well as stroke times (durations), sensor sequences, breaks (delay times) in sensor sequences, as well as external input (e.g., button clicks).

At block 904, the process 900 may include processing (or causing to process) the sensor readings to generate data indicative of character strokes the component for writing imparts on the writing medium. In embodiments, sensor data may be stored (internally, on a local device, or in a cloud). In some embodiments, the sensor data may be provided for further processing, such as streamed to a digital media application for real time or later-time translation and generation of letters and words.

In embodiments, sensor data processing may be performed in a number of ways. For example, sensor data sequences indicative of writing device strokes may be translated into shapes. The shape of the character strokes (a curve, a straight line, a dot, or a combination of those shapes) may be inferred from the sensor data, such as sequences of changes of sensors' capacitances in response to stress or compression. For example, a relatively constant voltage for some amount of time received from one or more sensors may indicate a straight line. In another example, a curve may be indicated by a parabolic shape trace (voltage over time) for each sensor. This may be tracked on the sensors for the length of the traced curve. For example, if a circle is drawn all sensors may be activated in a determined (e.g., 360 degree) sequence with some amplitude ramping, up then down, and the next sensor may provide a similar trace. These traces may overlap because the next sensor may start compressing prior to full decompression of the previous sensor (that was being depressed).

The shapes may be combined to form a letter. The letters may be then combined to form words. For example, letters may be broken into characters based on matching sensor data with known shapes and comparing to adjacent shapes. Letters, words, and punctuation may be determined based on sensor data, spelling, and grammar. For example, the word data may be compared with word data base and suitable matches (e.g., with desired error margin) may be selected.

Feedback from the application, such as after the document is translated into digital media, appropriate corrections made may be fed back into the processing routine to increase the accuracy for determining individual writing styles.

In embodiments, processing may include executing commands provided by the user, if user input via external input interface has been detected.

The embodiments described herein may be further illustrated by the following examples.

Example 1 may be a device for writing with character stroke sensing, comprising: a body; a component for writing disposed substantially lengthwise inside the body; and one or more sensors disposed inside the body, substantially around with the component for writing, to sense deviations of the component for writing from a default position inside the body, in response to a contact of the component for writing with a writing medium, wherein the sensed deviations are used to generate data indicative of character strokes the component for writing imparts on the writing medium.

Example 2 may include the device for writing of example 1, further comprising a processing block disposed inside the body of the device to generate the data indicative of the character strokes imparted on the writing medium, based on the sensed deviations.

Example 3 may include the device for writing of example 1, further comprising a battery disposed inside the body coupled with the sensors, to power the sensors.

Example 4 may include the device for writing of example 1, wherein the one or more sensors comprise capacitive sensors, responsive to stretch and compression caused by the deviations of the component from the default position inside the body of the device, wherein readings of the one or more sensors indicate a measure of the deviations of the component from the default position inside the body of the device for writing.

Example 5 may include the device for writing of any of examples 1 to 4, wherein the component for writing comprises a cartridge coupled with a writing tip, wherein the component for writing is to deviate from the default position in response to application to the component for writing of an axial force or a resistance force that result from a contact of the writing tip with the writing medium.

Example 6 may include the device for writing of example 5, wherein the default position of the component for writing is a position of the component for writing inside the device for writing, in an absence of the application of the axial or resistance forces to the component for writing.

Example 7 may include the device for writing of example 5, wherein the one or more sensors comprise a plurality of sensors disposed substantially radially inside the body of the device for writing, and substantially around the component for writing, to detect the application of the axial or resistance forces to the component for writing.

Example 8 may include the device for writing of example 7, wherein the plurality of sensors are further disposed around the component for writing in a substantially circular configuration.

Example 9 may include the device for writing of example 8, further comprising a plate disposed radially around the cartridge, wherein the plurality of sensors are coupled with the plate to detect deviations of the plate from a plate default position, wherein a plate deviation is indicative of a deviation of the component for writing from the default position of the component.

Example 10 may include the device for writing of example 2, wherein to generate data indicative of character strokes the processing block is to identify and provide: time periods to provide the character strokes, time periods between the character strokes, duration of a sensing session, or shapes of the character strokes.

Example 11 may include the device for writing of example 10, wherein the generated data is provided for further processing, wherein further processing includes to generate letters and words, based at least in part on the provided character strokes, time periods between the character strokes, or shapes of the character strokes.

Example 12 may be a method for providing a device for writing with character stroke sensing, comprising: providing a body of the device for writing, the body including a space for placing a component for writing substantially lengthwise inside the body of the device for writing; and disposing one or more sensors substantially radially inside the body, wherein the one or more sensors are to surround the component for writing in response to placing the component for writing inside the body of the device for writing, wherein the one or more sensors are to sense deviations of the component for writing from a default position inside the body, in response to a contact of the component for writing with a writing medium.

Example 13 may include the method of example 12, further comprising: disposing a processing block inside the body of the device for writing, to receive and process sensor readings that indicate a measure of the deviation of the component for writing from the default position inside the body of the device for writing.

Example 14 may include the method of example 13, further comprising: forming one or more communication paths between the one or more sensors and the processing block, to provide for receiving the sensor readings by the processing block.

Example 15 may include the method of example 12, wherein disposing one or more sensors substantially radially inside the body includes placing a plurality of sensors substantially around the space for placing the component for writing inside the body of the device for writing.

Example 16 may include the method of example 15, wherein placing a plurality of sensors substantially around the space for placing the component for writing includes disposing the plurality of sensors around the space in a substantially circular configuration.

Example 17 may include the method of example 12, further comprising: disposing a plate around the space for placing the component for writing inside the body, to radially contact the component for writing in response to placing the component for writing inside the body; and coupling the plurality of sensors with the plate, to detect deviations of the plate from a plate default position, wherein a plate deviation is indicative of a deviation of the component for writing from the default position of the component.

Example 18 may include the method of any examples 12 to 17, further comprising: disposing a battery inside the body of the device for writing; and forming a communication path between the processing block and the battery, to provide battery power to the processing block.

Example 19 may be one or more non-transitory computing device-readable media having executable instructions for character stroke sensing for a device for writing stored thereon that, in response to execution, cause a computing device to: receive sensor readings from one or more sensors disposed in the device for writing and communicatively coupled with the computing device, wherein the readings indicate deviations of a component for writing of the device for writing from a default position inside the device for writing, in response to a contact of the component for writing with a writing medium; and process the sensor readings to generate data indicative of character strokes the component for writing imparts on the writing medium.

Example 20 may include the non-transitory computing device-readable media of example 19, wherein the instructions that cause the computing device to process the sensor readings further cause the computing device to identify and provide: time periods to provide the character strokes, time periods between the character strokes, duration of a sensing session, or shapes of the character strokes.

Example 21 may include the non-transitory computing device-readable media of any of examples 19 to 20, wherein the instructions further cause the computing device to provide the data for further processing or to conduct further processing, wherein further processing includes to generate letters and words, based at least in part on the provided data.

Various operations are described as multiple discrete operations in turn, in a manner that is most helpful in understanding the claimed subject matter. However, the order of description should not be construed as to imply that these operations are necessarily order dependent. Embodiments of the present disclosure may be implemented into a system using any suitable hardware and/or software to configure as desired.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. A device for writing with character stroke sensing, comprising:
   a body;
   a component for writing disposed substantially lengthwise inside the body; and
   a plurality of sensors disposed inside the body, substantially around the component for writing, to sense deviations of the component for writing from a default position inside the body, in response to a contact of the component for writing with a writing medium, wherein a sensor of the plurality of sensors includes a segment comprising a stretchable material, a first electrode disposed in a circumferential fashion inside the stretchable material at a first distance from the component for writing, and a second electrode disposed in the circumferential fashion inside the stretchable material at a second distance from the component for writing, wherein one of the first or second electrodes is disposed between another one of the first or second electrodes and the component for writing, wherein the body includes one or more wire routing channels disposed between adjacent ones of the plurality of sensors, to provide wiring for the first and second electrodes,
   wherein the sensed deviations are used to generate data indicative of character strokes the component for writing imparts on the writing medium.

2. The device for writing of claim 1, further comprising a processing block disposed inside the body of the device to generate the data indicative of the character strokes imparted on the writing medium, based on the sensed deviations.

3. The device for writing of claim 2, wherein to generate data indicative of character strokes, the processing block is to identify and provide: time periods to provide the character strokes, time periods between the character strokes, duration of a sensing session, or shapes of the character strokes.

4. The device for writing of claim 3, wherein the generated data is provided for further processing, wherein further processing includes to generate letters and words, based at least in part on the provided character strokes, time periods between the character strokes, or shapes of the character strokes.

5. The device for writing of claim 1, further comprising a battery disposed inside the body coupled with the sensors, to power the sensors.

6. The device for writing of claim 1, wherein the plurality of sensors comprise capacitive sensors, responsive to stretch and compression caused by the deviations of the component for writing from the default position inside the body of the device, wherein readings of the sensors indicate a measure of the deviations of the component from the default position inside the body of the device for writing.

7. The device for writing of claim 1, wherein the component for writing comprises a cartridge coupled with a writing tip, wherein the component for writing is to deviate from the default position in response to application to the component for writing of an axial force or a resistance force that result from a contact of the writing tip with the writing medium.

8. The device for writing of claim 7, wherein the default position of the component for writing is a position of the component for writing inside the device for writing, in an absence of the application of the axial or resistance forces to the component for writing.

9. The device for writing of claim 7, wherein the plurality of sensors are disposed substantially radially inside the body of the device for writing, and substantially around the component for writing, to detect the application of the axial or resistance forces to the component for writing.

10. The device for writing of claim 9, wherein the plurality of sensors are further disposed around the component for writing in a substantially circular configuration.

11. The device for writing of claim 10, further comprising a plate disposed radially around the cartridge, wherein the plurality of sensors are coupled with the plate to detect deviations of the plate from a plate default position, wherein a plate deviation is indicative of a deviation of the component for writing from the default position of the component.

12. A method for providing a device for writing, comprising:
  providing a body of the device for writing, the body including a space for placing a component for writing substantially lengthwise inside the body of the device for writing; and
  disposing a plurality of sensors substantially radially inside the body, wherein the plurality of sensors are to surround the component for writing in response to placing the component for writing inside the body of the device for writing, wherein disposing the plurality of sensors includes, for a sensor of the plurality of sensor, providing a segment comprising a stretchable material, disposing a first electrode in a circumferential fashion inside the stretchable material at a first distance from the component for writing, and disposing a second electrode in the circumferential fashion inside the stretchable material at a second distance from the component for writing, including disposing one of the first or second electrodes between another one of the first or second electrodes and the component for writing; and
  disposing one or more wire routing channels between adjacent ones of the plurality of sensors in the body of the device for writing,
  wherein the plurality of sensors are to sense deviations of the component for writing from a default position inside the body, in response to a contact of the component for writing with a writing medium.

13. The method of claim 12, further comprising: disposing a processing block inside the body of the device for writing, to receive and process sensor readings that indicate a measure of the deviation of the component for writing from the default position inside the body of the device for writing.

14. The method of claim 13, further comprising: forming one or more communication paths between the plurality of sensors and the processing block, to provide for receiving the sensor readings by the processing block.

15. The method of claim 12, wherein disposing the plurality of sensors substantially radially inside the body includes placing the plurality of sensors substantially around the space for placing the component for writing inside the body of the device for writing.

16. The method of claim 15, wherein placing the plurality of sensors substantially around the space for placing the component for writing includes disposing the plurality of sensors around the space in a substantially circular configuration.

17. The method of claim 12, further comprising:
  disposing a plate around the space for placing the component for writing inside the body, to radially contact the component for writing in response to placing the component for writing inside the body; and
  coupling the plurality of sensors with the plate, to detect deviations of the plate from a plate default position, wherein a plate deviation is indicative of a deviation of the component for writing from the default position of the component for writing.

18. The method of claim 12, further comprising:
  disposing a battery inside the body of the device for writing; and
  forming a communication path between a processing block and the battery, to provide battery power to the processing block.

* * * * *